Figure 7:
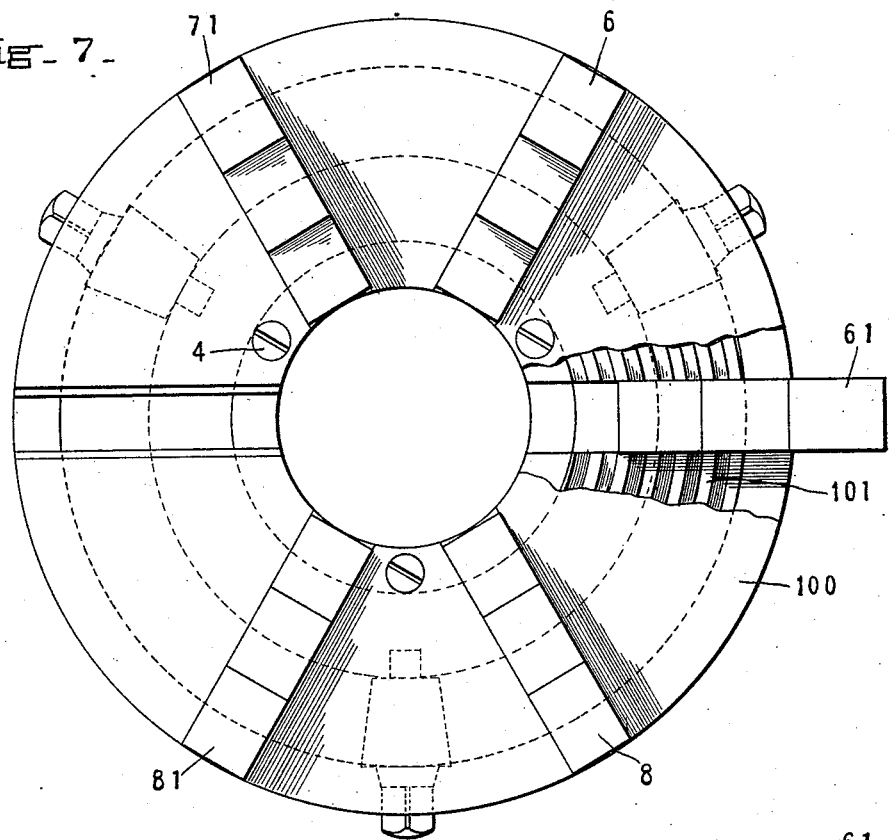

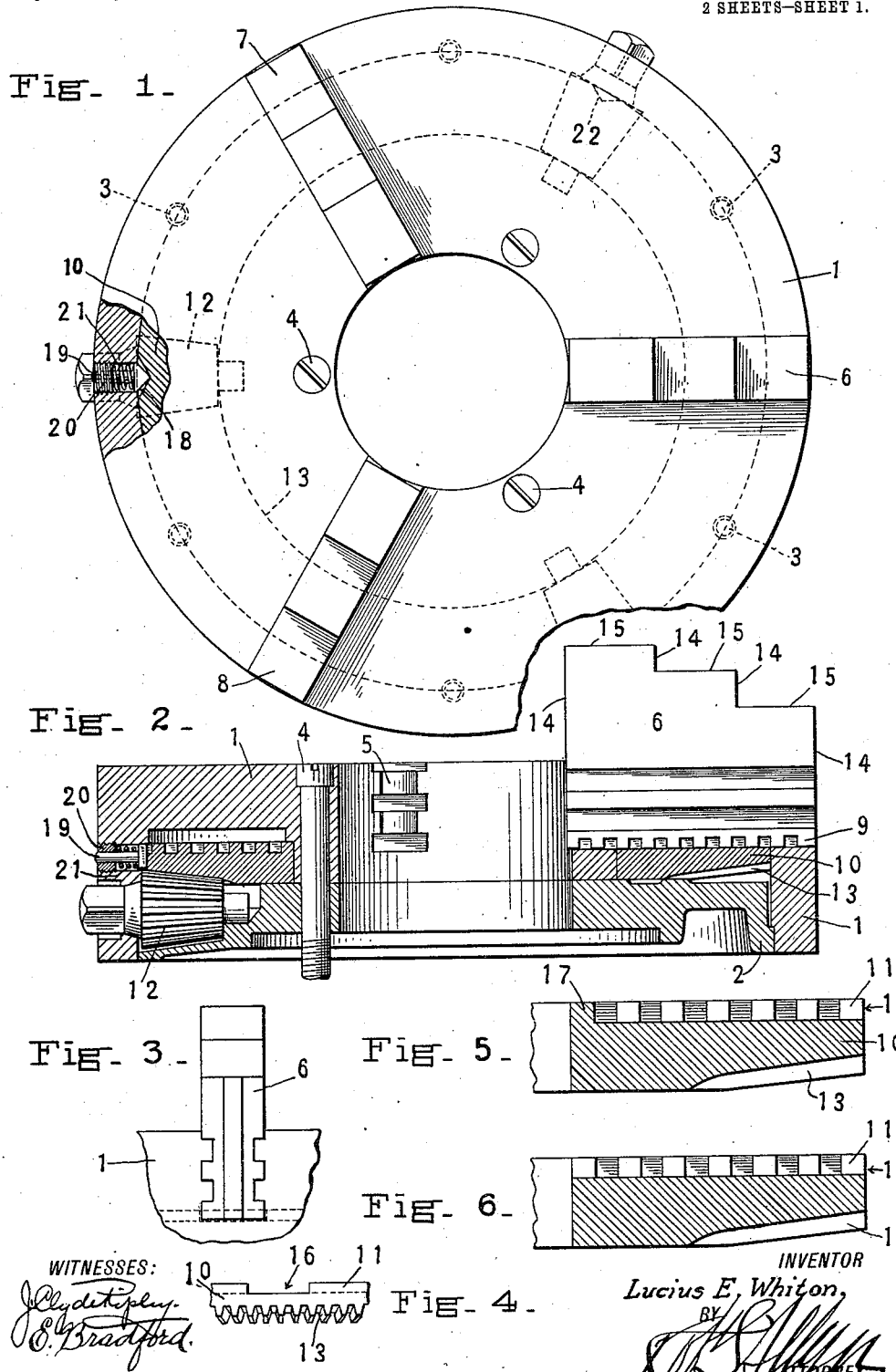

L. E. WHITON.
WORK HOLDER.
APPLICATION FILED APR. 25, 1910.

1,046,523.

Patented Dec. 10, 1912.
2 SHEETS—SHEET 2.

WITNESSES:

INVENTOR
Lucius E. Whiton.
BY
ATTORNEY

UNITED STATES PATENT OFFICE.

LUCIUS E. WHITON, OF NEW LONDON, CONNECTICUT.

WORK-HOLDER.

1,046,523. Specification of Letters Patent. Patented Dec. 10, 1912.

Application filed April 25, 1910. Serial No. 557,493.

*To all whom it may concern:*

Be it known that I, LUCIUS E. WHITON, a citizen of the United States, residing at New London, in the county of New London and State of Connecticut, have invented certain new and useful Improvements in Work-Holders, of which the following is a specification.

My invention relates particularly to devices for holding the jaws of scroll chucks during processes of manufacture. In the process of manufacturing chucks of this type, the jaws, after having been milled and fitted to the radial slots of the chuck body, must be "turned" up concentrically in sets and be finished on the gripping surfaces and on the bearing surfaces for properly supporting and positioning the work to be held in the chucks. For this purpose it has been customary to "turn" the jaws in the chucks to which they belong, first running the jaws in to the chucks from the outer ends of the slots by rotating the scroll-plate pinions by hand. This operation requires the constant changing of the chucks on the lathes and also a great many revolutions of the chuck wrench, which not only takes a great amount of time, but wears out the teeth of the scroll-plate and the teeth of the jaws. To save this time and wear I have devised the invention herein set forth.

Stated briefly it consists in providing a special device for holding temporarily all the jaws of one or more sets, which holder remains fixed on the lathe during use, and in which parts of the teeth of the scroll-plate of the special work-holder are cut away so as to form a channel a very little wider than the width of the jaws so that when the channel is brought directly under one of the guide-ways in the body of the work-holder a jaw may be inserted and pushed way into the inner edge of the work-holder face or nearly there. The scroll-plate of the work-holder may then be rotated through a partial turn to lock the jaw in place. A single channel may thus serve for assembling one or more jaws in the work-holder body by simply turning the scroll-plate so as to bring the channel successively beneath the different radial guide-ways and inserting the different jaws. A number of these radial channels in the face of the work-holder scroll-plate may be provided to correspond with the number of jaws in one or more sets to be finished, in which case, all the channels being brought into registration with the jaw guide-ways, all the jaws may be inserted at once and locked by a partial rotation of the scroll-plate. In order to position the scroll-plate accurately with the channel registering with a jaw guide-way I provide a simple catch adapted to snap into a notch or recess in the edge of the scroll-plate when proper registration of the channel and guide-way occurs. In order to indicate when the channel and guide-way are in registration I extend the shank of the catch through the flange of the body of the work-holder so that when the shank protrudes it will be known that the registration is not effected but when the end of the shank is flush or substantially flush with the outer surface of the flange of the body it will be known that the parts are in proper position to permit insertion of a jaw.

Figure 8:
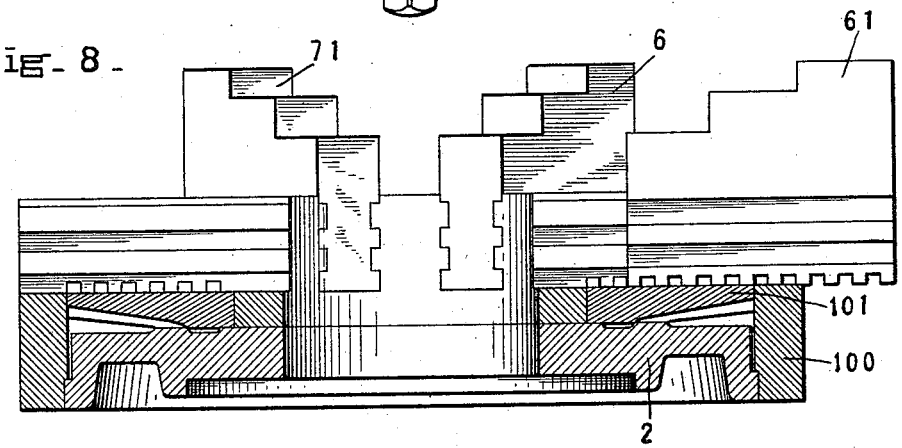

Figure 1, is a view of the face of a work-holder embodying the improvements of my invention, for a set of three jaws, a fragment being broken away. Fig. 2, is a diametrical section of the same. Fig. 3, is an end view of a chuck jaw showing it mounted in a fragment of the work-holder. Fig. 4, is a fragmentary edge view of the work-holder scroll-plate showing a radial channel. Fig. 5, is a section of a fragment of the same scroll-plate taken through one of the radial channels but showing the channel extending only part way across the face of the scroll-plate. Fig. 6, is a similar view, the channel being cut clear across all of the teeth of the scroll-plate. Fig. 7, is a front view of a holder for six jaws to accommodate two sets of three jaws at one time. Fig. 8, is a sectional view of the holder of Fig. 7. In these two last figures four jaws are in place and one more is being inserted.

The body 1 of the work-holder preferably has radial slots for one or more sets of jaws and is provided with a backing or backing-plate 2 secured to the body by any suitable means such for instance, as the plurality of screws 3, 3. The work-holder is adapted to be screwed to and remains attached to the face plate of a lathe for instance, by means of one or more screws such as 4. In the face of the work-holder are provided a plurality of radial guide-ways such as 5 to accommodate the jaws such as 6, 7 and 8 in suitable manner. Each jaw to be finished has on its lower surface a series of teeth such as 9.

A scroll-plate 10 is mounted between the main body 1 and the back-plate 2 of the work-holder and has the usual scroll teeth such as 11 meshing with the teeth on the bottom of the chuck jaws. One or more bevel pinions such as 12 are provided whose teeth register with the teeth 13 on the back of the scroll-plate for the purpose of rotating the scroll-plate and moving the chuck jaws in and out in the customary manner.

The surfaces for the finishing of which my invention is particularly directed are indicated in Fig. 2 at 14 and 15.

Across the face or partially across the face of the scroll teeth of the scroll-plate 10 I cut a channel or groove such as 16 in a radial direction and slightly wider than the base of a chuck jaw. This channel may be cut all the way across the face of the scroll-plate as shown in Fig. 6 or may leave one or more teeth such as 17 at the inner edge as shown in Fig. 5. In the latter case an abutment or stop is thus provided so that when the chuck jaw is inserted it can be pushed up against one of the scroll chuck teeth and thus be sure to be in exact position to permit the scroll-plate to be rotated for the purpose of holding the jaw. In the edge of the scroll-plate I provide one or more notches such as 18 preferably one notch for each radial slot. This notch is preferably rather shallow and adapted to receive the V-shaped end of the plunger 19. The shank of this plunger extends through a bushing 20 in the rim of the work-holder body and a spring 21 presses the plunger against the rim of the scroll-plate. The plunger serves to offer some resistance to the turning of the scroll-plate but does not prevent it. When the shank of the plunger projects beyond the rim of the work-holder it will be known that the scroll-plate is not in its proper position to permit insertion of a chuck jaw. A single indicating catch will usually be sufficient but I prefer to have a series of notches one corresponding to each of the plurality of radial slots such for instance, as the notches 18 and 22. This is desirable whether there is one channel across the face of the scroll teeth or a plurality of channels corresponding to the number of jaws. In the first case the different notches will serve to indicate when the single channel is brought into registration with the different guide-ways. In the second case the different notches will permit the registration point to be more quickly ascertained. When the jaws are inserted in the work-holder for the purpose of truing them up and finishing them, the scroll-plate is turned, as before mentioned, a partial revolution so as to lock the jaws in position. A ring or bushing or other device is then placed between or around the jaws and the jaws are "set up" so as to take up the slight backlash and hold the jaws steady while they are being trued up. At this time of course the shank of the indicating catch is protruded slightly from the rim of the work-holder body. When it is desired to remove the jaws the scroll-plate is rotated until the plunger 19 snaps into one of the notches 18, etc., at which time one or more of the jaws may be removed depending upon whether there is one channel or a number of channels corresponding to the number of jaws.

The holder may be made to accommodate a number of jaws as for instance, the jaws of two sets of three as shown in Figs. 7 and 8. The jaw corresponding to jaw 7 of Fig. 1 is omitted for purpose of illustration and the second set of jaws are indicated at 61, 71 and 81. Jaw 61 is just being inserted or removed showing how it can be slid in and out. In this case there are preferably six radial slots or channels in the holder body 100 and a corresponding number in the scroll-plate 101.

What I claim is:—

1. In a work-holder for scroll chuck jaws, a body having a plurality of radial guide-ways, a scroll-plate having one or more radial channels cut across the face of some of the scroll teeth to permit of the insertion and removal of the jaws.

2. In a work-holder for scroll chuck jaws, a body having a plurality of radial guide-ways, a scroll-plate having one or more radial channels cut across the face of some of the scroll teeth to permit of the insertion and removal of the jaws and means for indicating when a channel registers with a guide-way.

3. In a work-holder, a body having a plurality of radial guide-ways for chuck jaws, a scroll-plate for adjusting the jaws, said scroll-plate having one or more radial channels cut across the face of some of the scroll teeth to permit of the convenient insertion and removal of the jaws, and means for indicating when a channel registers with a guide-way.

4. In a work-holder for scroll chuck jaws, a body having a plurality of radial guide-ways for chuck jaws, a scroll-plate for adjusting chuck jaws and having a channel cut through the face of some of the scroll teeth to permit of the rapid insertion and removal of the chuck jaws.

5. In a work-holder, a body having a plurality of radial guide-ways for chuck jaws, a scroll-plate for adjusting chuck jaws and having a channel cut through the face of some of the scroll teeth to permit of the insertion and removal of the chuck jaws, said scroll-plate having one or more notches and a spring pressed device for coacting with a notch when the channel in said scroll-plate registers with one of the guide-ways in the work-holder body.

6. In a work holder, a body having radial guide ways, a rotatable scroll plate having a projecting spiral rib, chuck jaws fitted in said guide ways and having teeth engaging said scroll rib, one of said first mentioned elements having channels to permit one of said jaws to be inserted in said body and to permit all the teeth of said jaws to simultaneously engage all the turns of the scroll rib.

7. In a work holder for scroll chuck jaws, a body having a plurality of radial guideways, a scroll plate having one or more radial channels cut across the face of some of the scroll teeth to permit of the insertion and removal of the jaws and a catch for holding said scroll plate relative to said body when a radial channel registers with a radial guide way.

8. In a work holder for scroll chuck jaws, a body having a plurality of radial guideways, a scroll plate having one or more radial channels cut across the face of some of the scroll teeth to permit of the insertion and removal of the jaws and a yielding catch for holding said scroll plate relative to said body when a radial channel registers with a radial guide way.

9. In a work-holder, a body having a plurality of radial jaw-receiving guide-ways, a scroll-plate for holding and moving chuck jaws, said scroll-plate having at least one radial jaw-receiving channel in its face and an indicating catch coöperating with said scroll-plate.

LUCIUS E. WHITON.

Witnesses:
 LUTHER G. STEBBINS,
 JACOB H. GUMBLE.

Copies of this patent may be obtained for five cents each, by addressing the "Commissioner of Patents, Washington, D. C."